United States Patent [19]

Birch

[11] Patent Number: 5,020,706
[45] Date of Patent: Jun. 4, 1991

[54] BICYCLE SPOKE HOLDER

[76] Inventor: Scott Birch, 16624 22nd Ave., SE., Bothell, Wash. 98012

[21] Appl. No.: 536,080

[22] Filed: Jun. 11, 1990

Related U.S. Application Data

[62] Division of Ser. No. 415,868, Oct. 2, 1989, abandoned.

[51] Int. Cl.⁵ .............................................. B62J 9/02
[52] U.S. Cl. .................................... 224/39; 224/35; 248/229; 248/231; 24/17 A
[58] Field of Search ................ 224/30 R, 30 A, 32 R, 224/34–41, 274

[56] References Cited

U.S. PATENT DOCUMENTS

| | | | |
|---|---|---|---|
| 498,015 | 5/1893 | Luebben | 224/32 R |
| 586,295 | 7/1897 | Terry | 224/39 |
| 2,010,479 | 8/1935 | Dennis | 224/32 R |
| 2,583,550 | 1/1952 | Dennis et al. | 224/32 R |
| 2,700,493 | 1/1955 | Meier, Jr. | 224/36 |
| 2,709,027 | 5/1955 | Kozub | 224/274 |
| 3,014,595 | 12/1961 | Bartmann | 224/918 X |
| 3,062,422 | 11/1962 | Lord | 224/274 X |
| 3,128,021 | 4/1964 | Habbena | 224/274 |
| 3,142,424 | 7/1964 | Reed, Jr. | 224/32 R |
| 3,648,908 | 3/1972 | Thompson | 224/37 |
| 3,870,300 | 3/1975 | Amendola | 224/274 X |
| 3,907,183 | 9/1975 | Shearer, Sr. et al. | 224/32 R |
| 3,918,735 | 11/1975 | Denzer et al. | 280/652 |
| 3,921,868 | 11/1975 | Reichbach | 224/39 X |
| 4,225,848 | 9/1980 | Roberts | 340/432 |
| 4,256,281 | 3/1981 | Harris et al. | 248/231 |
| 4,350,361 | 9/1982 | Fujii | 224/30 R |
| 4,390,191 | 6/1983 | Acker | 280/281.1 |
| 4,449,561 | 5/1984 | Head | 152/213 R |
| 4,763,230 | 8/1988 | Cummings et al. | 362/78 |
| 4,817,833 | 4/1989 | Rebera | 224/36 |

FOREIGN PATENT DOCUMENTS

| | | | |
|---|---|---|---|
| 0487355 | 10/1952 | Canada | 224/36 |
| 2546593 | 4/1977 | Fed. Rep. of Germany | 224/36 |
| 0514211 | 2/1955 | Italy | 224/30 A |
| 0713704 | 8/1954 | United Kingdom | 224/39 R |
| 0919972 | 2/1963 | United Kingdom | 224/30 A |

OTHER PUBLICATIONS

Baumeister, Theodore et al., Marks' Standard Handbook for Mechanical Engineers, 1979, pp. 6-165-6-167.

Primary Examiner—Henry J. Recla
Assistant Examiner—Casey Jacyna
Attorney, Agent, or Firm—Michael G. Petit

[57] ABSTRACT

A spoke holder comprising a pair of identical structural members which attach to the frame of a bicycle in a variety of locations. The spoke holder, in addition to bicycle frame attachment means, has multiple channels passing therethrough, each channel being capable of securely and removably holding a single spoke. Two different embodiments of the spoke holder are described which may be securely attached to the bicycle frame by the adjustment of either a screw or a plastic tie.

2 Claims, 2 Drawing Sheets

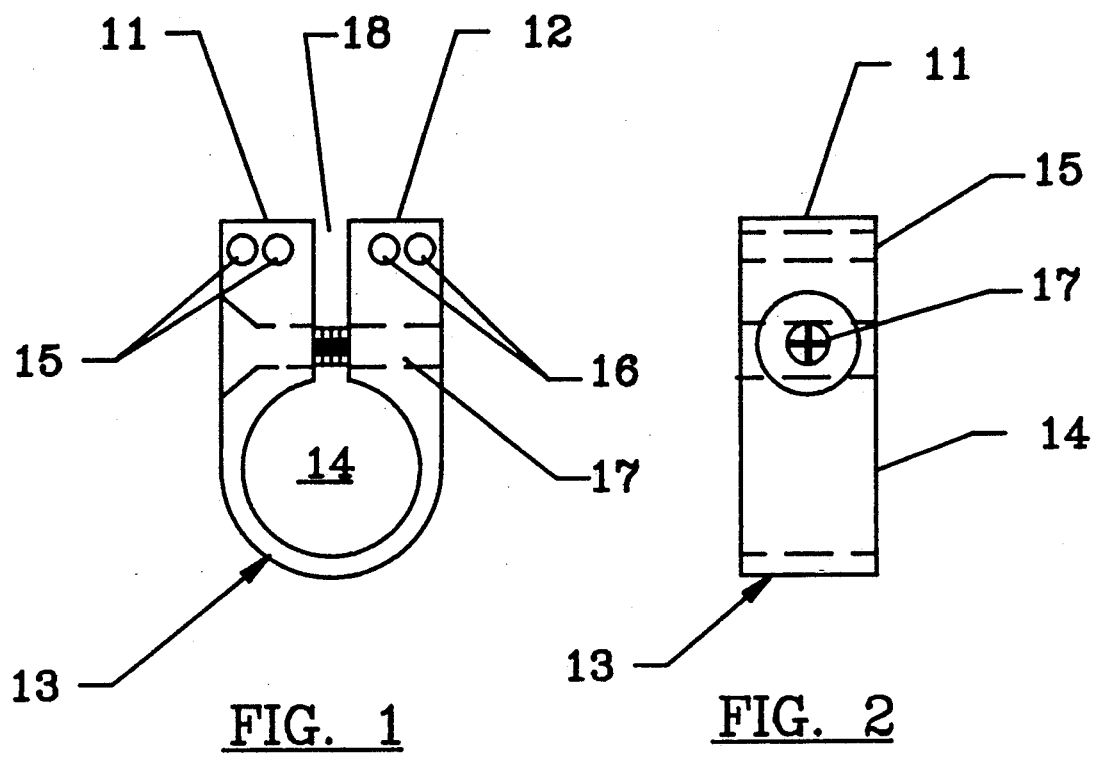
FIG. 1
FIG. 2
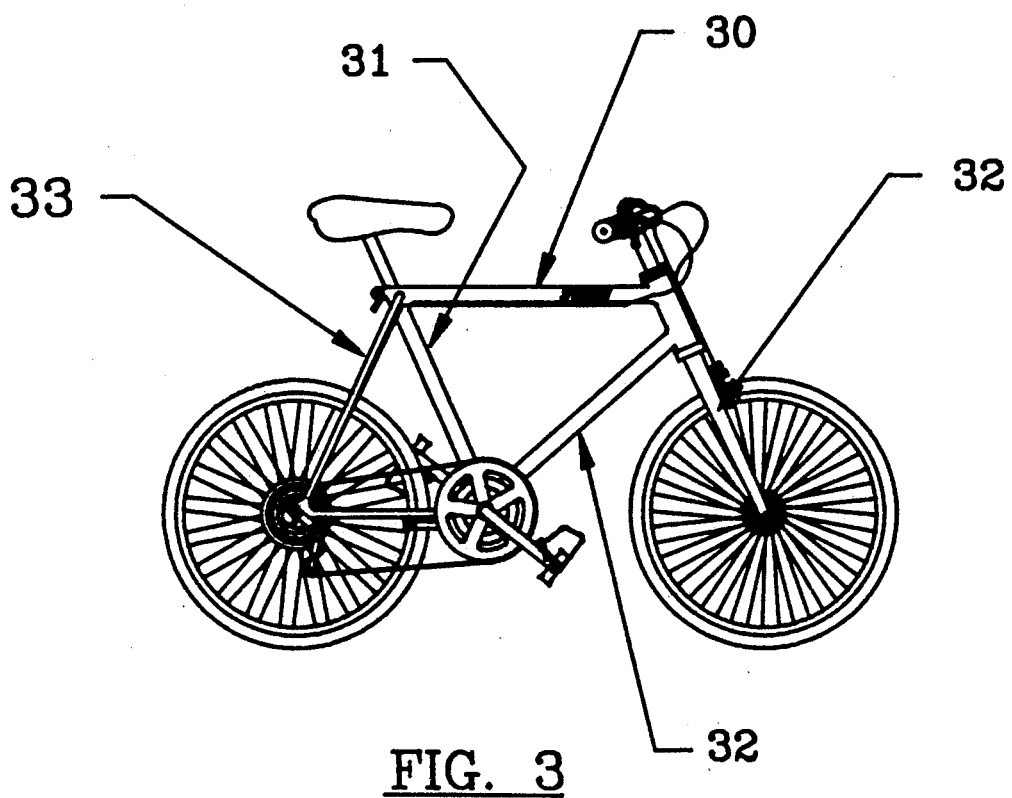
FIG. 3

BICYCLE SPOKE HOLDER

CROSS-REFERENCE TO RELATED APPLICATIONS

This is a division of application Ser. No. 415,868, filed Oct. 2, 1989, now abandoned. CYCLE SPOKE HOLDER - Docket No. 89-13-A

BACKGROUND OF THE INVENTION

1. Field of the Invention

This invention relates generally to a bicycle accessory and specifically to a bicycle spoke holder.

2. Description of the Prior Art

Bicycle wheels depend upon adequate and uniform spoke tension to fulfill their design and performance objectives. Both the strength and the roundness of the rim of a conventional bicycle wheel is determined by the tension on the spokes of the wheel relative to each other. When a spoke breaks, as for example when a bicycle hits an obstacle on the trail such as a rock or a branch, the rim goes out of round, wobbling against the brake pad; or a broken piece of spoke may hit the frame or brake pad and stall the bike. If the rider happens to be on a mountain bike far from the nearest highway, the out-of-round tire will oblige the rider to either carry or roll the bicycle out but it will not be rideable.

Most bikes have three different lengths of spokes: one length in the front wheel and two different lengths on the chain wheel because the chain wheel hub cluster is bigger than the chain side. In addition, the rear rim is usually smaller in diameter than the front rim.

In summary, it is apparent that in the event of a broken spoke, the rider has two options available:

(a) tighten the adjacent spokes, if possible, to straighten out the wheel, and walk the bicycle to a location where the spoke may be replaced; or (b) carry extra spokes and replace the broken spoke with a new spoke.

Bicyclists typically tape extra spokes to their bicycle pump or to a part of the bicycle frame in case they break a spoke. However, because the spokes are quite long, they interfere with operation of the pump and must be removed before the pump can be used. It is, therefore, surprising that no spoke holder has been devised which is generally useful for mounting on bicycles yet capable of carrying at least three different kinds of spokes. The present invention provides such a device.

SUMMARY OF INVENTION

The principal object of this invention is to provide a spoke holder that is easily mounted onto the frame of a bicycle, is easy to use, durable, inexpensive and capable of releasably holding at least three different lengths of bicycle spokes including those used in modern, lightweight wheels.

Another object of this invention is to provide a spoke holder which is simple and easy to manufacture.

This invention meets the above-stated objects and provides a spoke holder with other advantages. In one embodiment, the holder consists of two connected mirror image sides which are positioned over the bicycle frame facing each other and are connected by a screw which tightens the holder against the frame. In a second preferred embodiment, the spoke holder is attached to the bicycle frame by a simple adjustable self-locking cable or strap such as is commonly used to bundle parallel electrical wires or cables together. The spoke holder has at least three holes which are drilled out or channeled in a manner that allows the holder to securely grip a spoke.

BRIEF DESCRIPTION OF THE DRAWINGS

FIG. 1 is a top elevational view of one member of the identical pair of members comprising the spoke holder of the present invention.

FIG. 2 is a side elevational view of FIG. 1.

FIG. 3 is a perspective view of a bicycle showing various frame members where the spoke holder may be attached.

DESCRIPTION OF THE PREFERRED EMBODIMENTS

Figure 4:
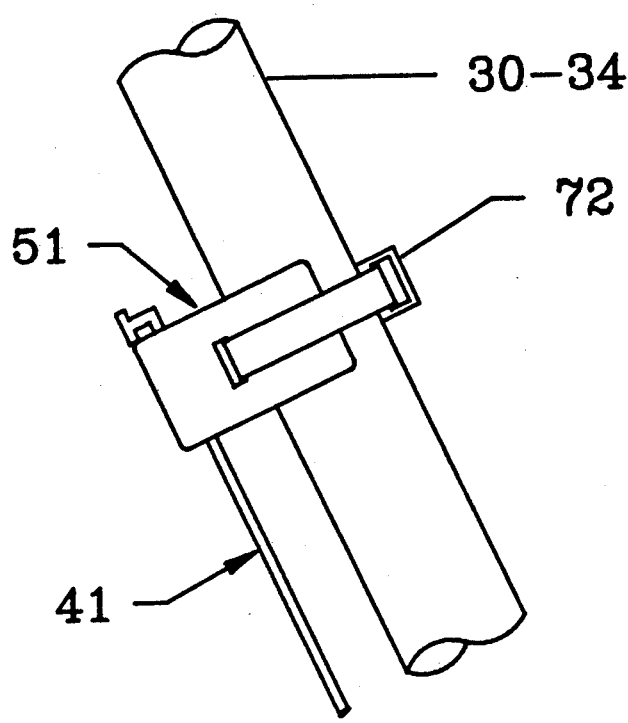
FIG. 4 is a close-up perspective view of one half of the spoke holder pair attached to the frame with a spoke in place.

Referring now more particularly to FIGS. 1 and 2 of the drawings, a bicycle-mountable spoke holder (13) according to the present invention, for securely holding at least three or more conventional or specially made spokes (FIG. 4 (41)) of a standard bicycle wheel, or wheels, has a roughly U-shaped body (13) provided with a pair of spaced ends (11 and 12) with a slot (18) and a frame member receiving cavity (14) therebetween. Holes (15 and 16) having an inside diameter roughly equal to the outside diameter of a spoke, are drilled through the holder to extend from the top to the bottom. The spokes (not shown in FIGS. 1 and 2) may be inserted through these holes so that they are parallel with one another and parallel to the bicycle frame member to which the holder is attached. A second spoke holder (13) is mounted on the same bicycle frame member a little less than a spoke-length away from the first member of the pair. Each spoke holder securely holds one end of the spokes inserted therebetween which prevents bending of the spokes if they accidentally receive a lateral blow.

In practice, the spoke holder (13) is manually grasped by the two opposing ends (11 and 12) and spread apart so that channel (18) opens and the device is inserted over the bicycle frame member. After the holder is securely over the frame member such that the frame member rests within frame member receiving cavity (14), the spokes are inserted through the spoke holes (15 and 16) in both members of the pair of spoke holders. The screw (17) is then tightened down on each spoke holder to securely hold the cooperating pair of spoke holders to the bicycle frame. As the screw is tightened down, the opposing ends (11 and 12) of each member of the spoke holder pair are brought into contact and further tightening of the screw compresses the structural material of the spoke holder against the spoke providing a tight and secure hold.

Figure 5:
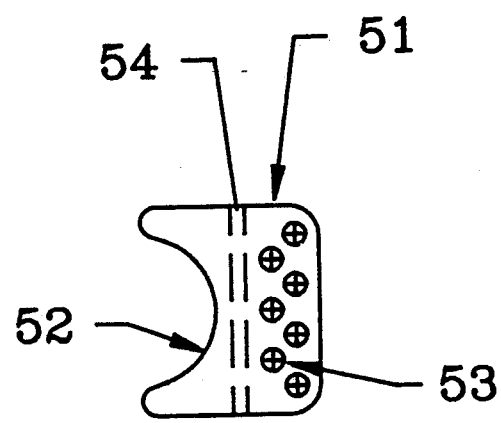
FIG. 5 is a top elevational view of one member of the identical pair of members comprising the spoke holder of the second preferred embodiment.
Figure 6:
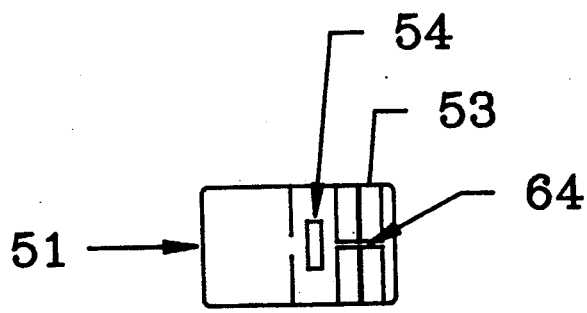
FIG. 6 is a side elevational view of the spoke holder member of FIG. 5.
Figure 7:
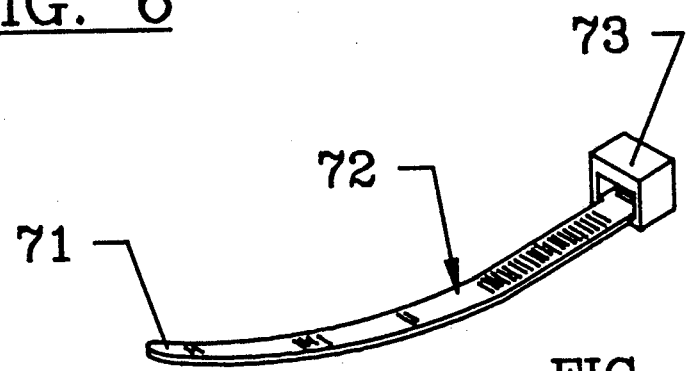
FIG. 7 is a perspective view of a versatile self-locking tie strap useful for securing the spoke holder of the second preferred embodiment to the frame of a bicycle.

The second preferred embodiment is shown in FIGS. 5 and 6 FIG. 5 is a top elevational view of one of the two identical members comprising the spoke holder. A concavity (52) is molded into the spoke holder (51) which concavity mates with the generally convex surface of one of the bicycle frame members indicated in FIG. 3 (30, 31, 32, 33, 34). This second embodiment differs from the first embodiment in that the holes (53) through which the spokes pass are intersected and closed by a thin membrane of silicone (64) (FIG. 6) which thin membrane is formed by making the mold pins (not shown) slightly short so they will not touch one another. The end (71) of a self-locking cable or tie (72) (FIG. 7) is passed through a slot (54) in the spoke holder (51) thereafter to encircle a selected bicycle frame member. The tie end (71) is then inserted through a self-locking tab (73) on the tie and cinched tight. Since tightening the self-locking strap or tie does not compress the holes to hold the spoke, the spoke is inserted into the hole (53) to pierce the membrane (64). The friction of the membrane against a spoke is sufficient to securely hold a spoke when the spoke is passed through both halves the spoke holder. One-half of the spoke holder of the second preferred embodiment is shown with spokes (41) in place in FIG. 4. The cooperating member of the identical spoke holder pair (not shown) would grip the spoke (41) at the spoke's opposite end (not shown).

Turning now to FIG. 3, it is apparent that a bicycle has a number of frame members to which the holder may be attached which include a top tube (30), a seat tube (31), a front fork (32) a chain stay (33) and a down tube (34).

Both preferred embodiments of the spoke holder are preferably molded of special ultra violet inhibitive silicone. It is obvious that the device may be made with modifications in size and materials and other screw-type fasteners or cables straps may be used to secure the spoke holder to a bicycle frame member.

The foregoing is considered as illustrative only of the principals of the invention. Further, since numerous modifications and changes will readily occur to those skilled in the art, it is not desired to limit the invention to the exact construction and operation shown and described and, accordingly, all suitable modifications and equivalents may be resorted to falling within the scope of the invention.

What I claim is:

1. A bicycle spoke holder assembly comprising:
   (a) at least one frame-mountable body member containing multiple holes passing therethrough, the inside diameter of said holes being substantially the same as the outside diameter of a bicycle spoke and a thin membrane comprised of an elastomer transecting said holes; and
   (b) a self locking tie strap means for securing said body member to said bicycle frame member.

2. The spoke holder assembly of claim 1 wherein said thin membrane is easily punctured by a spoke manually pressed thereagainst.

* * * * *